United States Patent [19]

Matsuo et al.

[11] Patent Number: 5,589,252
[45] Date of Patent: Dec. 31, 1996

[54] GAS BARRIER LAMINATED MATERIAL

[75] Inventors: Ryukichi Matsuo; Toshiaki Yoshihara, both of Saitama, Japan

[73] Assignee: Toppan Printing Co., Ltd., Tokyo, Japan

[21] Appl. No.: 314,802

[22] Filed: Sep. 29, 1994

[30] Foreign Application Priority Data

Sep. 30, 1993 [JP] Japan ............................ 5-245443
Mar. 31, 1994 [JP] Japan ............................ 6-064187

[51] Int. Cl.$^6$ .......................... B32B 7/02; B32B 27/40
[52] U.S. Cl. .................. 428/216; 428/35.3; 428/35.8; 428/35.9; 428/215; 428/335; 428/336; 428/425.5; 428/425.9
[58] Field of Search .................. 428/35.3, 35.8, 428/35.9, 335, 336, 425.5, 328, 331, 425.9, 215, 216; 528/39, 55, 48, 58

[56] References Cited

FOREIGN PATENT DOCUMENTS

| 62-295931 | 12/1987 | Japan . |
| 5-9317 | 1/1993 | Japan . |
| 864314 | 4/1961 | United Kingdom . |

OTHER PUBLICATIONS

Derwent Abstract of JP 62–295931, 23 Dec. 1987.

Derwent Abstract of JP 5–009317, 19 Jan. 1993.

*Primary Examiner*—D. S. Nakarani
*Attorney, Agent, or Firm*—Armstrong, Westerman, Hattori, McLeland & Naughton

[57] ABSTRACT

A gas barrier laminated material comprising a substrate, and an inorganic compound thin-film layer and a protective layer which are laminated in this order, wherein the protective layer is a layer formed by coating on the inorganic compound thin-film layer a coating composition containing a metal alkoxide or a hydrolyzate thereof and an isocyanate compound having two or more isocyanate groups, followed by heat drying, or a layer formed by coating on the inorganic compound thin-film layer a water-based coating composition containing a water-soluble polymer and at least one of (a) a metal alkoxide or a hydrolyzate thereof and (b) a tin chloride, followed by heat drying.

10 Claims, 1 Drawing Sheet

GAS BARRIER LAMINATED MATERIAL

BACKGROUND OF THE INVENTION

1. Field of the Invention

This invention relates to a laminated film with gas barrier properties (a gas barrier laminated film), used in the field of the packaging of food, pharmaceuticals and so forth.

2. Description of the Related Art

In recent years, packaging materials used for the packaging of food, medicines and so forth are required to block the effects of oxygen and water vapor passing through the packaging materials or other gases causative of changes in quality of contents, in order to prevent changes in quality of contents, in particular, in the case of food, in order to prevent proteins or fats and oils from being oxidized or undergoing denaturation and also preserve taste or freshness, and, in the case of pharmaceuticals required to be handled in a germless condition, in order to prevent effective components from undergoing changes in quality and maintain their efficacy. Thus, such packaging materials are sought to be endowed with gas barrier properties for shutting off these gases (gaseous matter).

Accordingly, those having been hitherto commonly used as packaging films are Gas barrier laminated films having laminates or coatings formed of resin compositions comprised of a polymer commonly said to have relatively high Gas barrier properties, such as polyvinyl alcohol (hereinafter "PVA"), an ethylene/vinyl acetate copolymer (EVOH) or polyvinylidene chloride resin (hereinafter "PVDC").

Metal deposited films with gas barrier properties are also in wide use, which are formed of suitable polymeric resin compositions (which may be comprised of a resin not having high gas barrier properties by itself) and metals such as aluminum or metal compounds deposited thereon. Nowadays, inorganic compound deposited films have been developed, which comprise a substrate comprised of a polymeric material having a transparency and a light-transmitting thin film such as a silicon oxide ($SiO_x$) thin film of silicon monoxide (SiO) or the like or a magnesium oxide (MgO) thin film formed on the substrate by a film-forming means such as vacuum deposition. These metal deposited films and inorganic compound deposited films have higher gas barrier properties than the above gas barrier laminated films formed of polymeric resin compositions, may undergo less deterioration in an environment of high humidity, and hence begin to be commonly used as packaging films.

The above gas barrier laminated films making use of a PVA or EVOH type polymeric resin composition, however, have so high temperature dependence and moisture dependence that their gas barrier properties may become poor in an environment of high temperature or high humidity, in particular, their water-vapor barrier properties may become poor. In some instances, depending on how packages are used, the gas barrier properties may become greatly poor when treated by boiling or treated in a retort.

The gas barrier laminated films making use of a PVDC type polymeric resin composition have a small humidity dependence, but have the problem that a high gas barrier material having oxygen barrier properties (oxygen transmission) of not more than 1 $cm^3/m^2 \cdot day \cdot atm$ can be actually obtained therefrom with difficulty. The PVDC type polymeric resin composition also contains chlorine in a large quantity, and hence has a problem on how to dispose of waste, e.g., on thermal disposal or recycling.

As for the above metal deposited films having a deposit of a metal or metal compound or the inorganic compound deposited films having a silicon oxide thin film of silicon monoxide (SiO) or the like or a magnesium oxide (MgO) thin film formed by deposition, they are laminated materials formed of components very different from each other in properties such as chemical properties and thermal properties, as exemplified by a laminated material comprised of a resin film and a metal deposit and a laminated material comprised of a resin film and an inorganic compound deposit. Hence, there is the problem that no satisfactory adhesion can be achieved between the both.

The inorganic compound deposited thin films used as gas barrier layers are also lacking in flexibility and has a low endurance to deflection and folding. Hence, care must be taken to handle them. In particular, there is the problem that they cause cracks when packaging materials are post-worked for printing, laminating, bag-making and so forth, to make gas barrier properties very poor.

The gas barrier layers such as inorganic compound deposited thin films are formed by a vacuum process such as vacuum deposition, sputtering or plasma-assisted chemical vapor deposition, and there is also the problem that the apparatus used therefor are expensive. Also, when the gas barrier layers are formed by such a vacuum process, the substrate resin film may locally have a high temperature, so that the substrate may be damaged or the substrate may undergo decomposition or gas escape at the part having a low molecular weight or the part containing a plasticizer or the like, to cause defects or pinholes in inorganic thin films serving as the gas barrier layers. Hence, such layers can not achieve high gas barrier properties and also have a problem of a high production cost.

Under such circumstances, a gas barrier material comprised of a substrate and a metal alkoxide coating formed thereon is proposed, as disclosed in Japanese Patent Application Laid-open No. 62-295931. This metal alkoxide coating has a flexibility to a certain degree and also can be produced by liquid-phase coating. Hence, it can promise a low production cost.

The above gas barrier material can be said to have been improved in gas barrier properties compared with an instance where the substrate is used alone, but can not be said to have satisfactory gas barrier properties in practical use.

As a process for producing a resin-coated product endowed with gas barrier properties, Japanese Patent Application Laid-open No. 5-9315 also discloses a process comprising the steps of forming a silicon oxide ($SiO_x$) deposited thin film on a substrate, and coating thereon a solution comprised of a mixture of $SiO_2$ particles and a water-soluble resin or water-based emulsion, followed by drying.

According to this production process, the layer formed of the mixture of $SiO_2$ particles and a resin by its coating on a $SiO_x$ deposited thin film can prevent microcracks from running through the $SiO_x$ deposited film when deformed by an external force to protect the crack portions., so that its gas barrier properties can be prevented from lowering.

However, the barrier material obtained by the above process only prevents microcracks from running through the deposited film to thereby prevent the gas barrier properties from lowering, and is only effective for merely protecting the deposited film. Hence, this material leaves the problem that it can have no higher gas barrier properties than the deposited film and can not achieve any higher gas barrier properties.

SUMMARY OF THE INVENTION

An object of the present invention is to provide a gas barrier laminated film that has a flexibility and superior gas barrier properties to oxygen, water vapor and so forth, has a thermal resistance, a moisture resistance and a water resistance, and also can be produced with ease.

According to a first embodiment, the present invention provides a Gas barrier laminated material comprising a substrate, and an inorganic compound thin-film layer and a protective layer which are laminated in this order, wherein the protective layer is formed by coating on the inorganic compound thin-film layer a coating composition containing a metal alkoxide or a hydrolyzate thereof and an isocyanate compound having two or more isocyanate groups, followed by heat drying.

According to a second embodiment, the present invention also provide a gas barrier laminated material comprising a substrate, and an inorganic compound thin-film layer and a protective layer which are laminated in this order, wherein the protective layer is formed by coating on the inorganic compound thin-film layer a water-based coating composition containing a water-soluble polymer and at least one of (a) a metal alkoxide or a hydrolyzate thereof and (b) a tin chloride, followed by heat drying.

DETAILED DESCRIPTION OF THE INVENTION

The present invention is characterized by a specific protective layer formed on an inorganic compound thin-film layer having good gas barrier properties but tending to cause cracks because of an insufficient flexibility; the protective layer being a layer formed by coating on the inorganic compound thin-film layer a coating composition containing a metal alkoxide or a hydrolyzate thereof and an isocyanate compound having two or more isocyanate groups, followed by heat drying, or a layer formed by coating on the inorganic compound thin-film layer a water-based coating composition containing a water-soluble polymer and at least one of (a) a metal alkoxide or a hydrolyzate thereof and (b) a tin chloride, followed by heat drying. Such a protective layer fills up any defects such as cracks and pinholes produced in the inorganic compound thin-film layer, and also reacts with the inorganic compound thin-film layer to greatly improve gas barrier properties. The protective layer also imparts folding endurance to the inorganic compound thin-film layer to make it hard for cracks to occur. Even if any defects such as pinholes, grain boundaries and cracks have occurred, the protective layer can cover or fill up them or reinforce the inorganic compound thin-film layer to highly maintain the gas barrier properties of the thin-film layer. Moreover, the gas barrier laminated material can be endowed with water resistance and moisture resistance.

The gas barrier laminated material according to the first embodiment of the present invention will be described below in detail with reference to FIG. 1.

Figure 1:
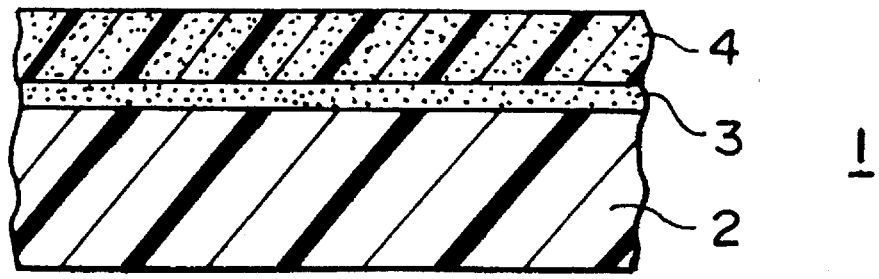
FIG. 1 is a schematic cross section of a gas barrier laminated material according to the first embodiment of the present invention.

In FIG. 1, a gas barrier laminated material 1 is comprised of a substrate 2, an inorganic compound thin-film layer 3 laminated thereto, and a protective layer 4 further laminated thereto.

In the first embodiment, the protective layer 4 is, as described above, a layer formed by coating on the inorganic compound thin-film layer a coating composition containing a metal alkoxide or a hydrolyzate thereof and an isocyanate compound having two or more isocyanate groups, followed by heat drying. The protective layer 4 thus formed is presumed to have the structure wherein the metal alkoxide or a hydrolyzate thereof is held in a layerform three-dimensional crosslinked structure derived from the isocyanate compound having two or more isocyanate groups.

Here, as the metal alkoxide contained in the coating composition, a compound represented by Formula (1) below may be used.

$$M(OR)_n \qquad (1)$$

wherein M represents a metal atom such as Si, Ti, Al, Zr or Sn, n represents a valence of M, and R's that number n each independently represent a lower alkyl group.

Preferred M in Formula (1) can be exemplified by Si, Al and Zr in view of solution stability and production cost of the alkoxide.

The alkyl group represented by R can be exemplified by a straight-chain or branched alkyl group having 1 to 6 carbon atoms, e.g., a methyl group, an isopropyl group or a butyl group.

A specifically preferred metal alkoxide of Formula (1) can be exemplified by tetraethoxysilane, triisopropoxylaluminum and tetrabutoxyzirconium, which can give a stable hydrolyzate in an aqueous medium.

The hydrolyzate of the metal alkoxide can be obtained by adding water and a catalytic amount of acid (e.g., hydrochloric acid) to the metal alkoxide followed by stirring. In the present invention, a hydrolyzate obtained by previously hydrolyzing the metal alkoxide may be used. Alternatively, the metal alkoxide may be hydrolyzed under conditions for forming the protective layer so that a hydrolyzate thereof can be formed.

As for the isocyanate compound having two or more isocyanate groups, it can be preferably exemplified by tolylenediisocyanate (hereinafter "TDI"), triphenylmethanetriisocyanate (hereinafter "TTI"), isophoronediisocyanate (hereinafter "IPDI"), tetramethylxylenediisocyanate (hereinafter "TMXDI"), or polymers or derivatives of any of these.

With regard to the mixing proportion of the metal alkoxide or a hydrolyzate thereof to the isocyanate compound in the coating composition, the protective layer may become brittle to tend to break if the metal alkoxide or a hydrolyzate thereof is in a too large proportion, and if it is in a too small proportion the protective layer may become less effective for improving gas barrier properties. Hence, the isocyanate compound may preferably be in an amount of from 5 to 400 parts by weight, and more preferably from 10 to 300 parts by weight, based on 100 parts by weight of the metal alkoxide or a hydrolyzate thereof.

To such a coating composition, a tin chloride as exemplified by stannous chloride, stannic chloride or a mixture of these may be further added. This makes it possible to prepare the coating composition in the form of a stable solution and to form uniform coatings. The tin chloride may be either an anhydrous or a hydrate.

To the coating composition, a melamine compound or a melamine resin may also be further added. This makes it possible to obtain the same effect as the addition of the tin chloride. The melamine compound can be exemplified by a melamine single product or an addition product such as methylolmelamine or dimethylolmelamine, obtained by reacting melamine with formaldehyde. As the melamine resin, commercially available known melamine resins may be used.

Besides the foregoing, known additives such as a dispersant, a stablizer, a viscosity modifier and a colorant may be appropriately added to the coating composition if necessary.

As described above, the protective layer 4 is formed by coating the coating composition on the inorganic compound thin-film layer described later, followed by heat drying.

The coating composition may be coated by any known processes, as exemplified by dip coating, roll coating, screen printing and spray coating, among which a suitable process may be selected.

Conditions for the heat drying that follows the coating may vary depending on the types of the components contained in the coating composition used. Since the heat drying must be carried out at a temperature that facilitates the polymerization of the isocyanate compound and also may cause no pinholes in the protective layer as the solvent evaporates, the heat drying is usually carried out at a temperature of from 40° to 200° C., and preferably from 60° to 180° C.

The protective layer formed in this way may have a dried-coating thickness of usually from 0.01 to 100 μm, and preferably from 0.01 to 50 μm, since a too thin layer can not well prevent a lowering of gas barrier properties of the inorganic compound thin-film layer described later and a too thick layer may cause cracks in the protective layer itself.

In the first embodiment of the present invention, the inorganic compound thin-film layer 3 is formed of an inorganic compound capable of exhibiting gas barrier properties when formed into a thin film. Such an i organic compound can be preferably exemplified by an oxide, nitride or fluoride of silicon (Si), aluminum (Al), titanium (Ti), zirconium (Zr) or tin (Sn), or a composite of any of these. In particular, the inorganic compound thin-film layer may preferably be an aluminum oxide thin-film layer, which is colorless and transparent and has a good suitability for retort treatment and boiling.

The inorganic compound thin-film layer 3 can be formed by, e.g., vacuum deposition, sputtering or plasma-assisted chemical vapor deposition (plasma CVD).

The inorganic compound thin-film layer 3 may have a thickness of from 50 to 3,000 angstroms, and preferably from 50 to 2,000 angstroms, since a too thin layer may cause a problem on thin-film continuity and a too thick film may result in a decrease in flexibility to tend to cause cracks.

As the substrate 2, it is possible to use polymeric sheet or film materials commonly used as substrates for packaging materials, among which a suitable material may be selected according to uses. Such materials can be preferably exemplified by polyolefins such as polyethylene and polypropylene, polyesters such as polyethylene terephthalate, polybutylene terephthalate and polyethylene naphthalate, polyamides such as nylon-6 and nylon-66, polyvinyl chloride, polyimide, and copolymers of these.

To such a substrate 2, an antistatic agent, an ultraviolet absorbent, a plasticizer, a lubricant, a colorant and so forth may be added if necessary.

The surface of the substrate 2 may also be subjected to a surface-modifying treatment such as corona discharge treatment or anchoring treatment. This can bring about an improvement in adhesion between the substrate 2 and the inorganic compound thin-film layer 3.

The gas barrier laminated material according to the second embodiment of the present invention will be described below. A schematic cross section of the gas barrier laminated material according to this embodiment is shown in FIG. 2.

Figure 2:
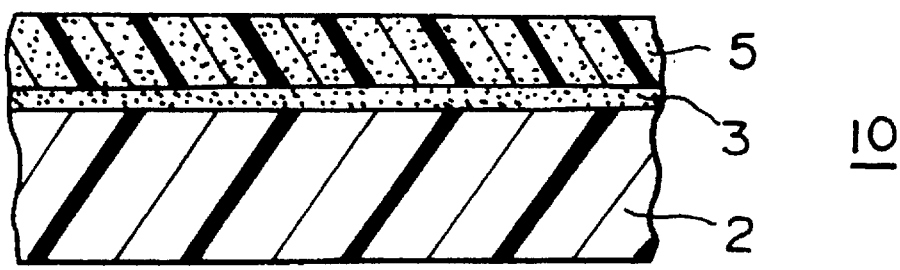
FIG. 2 is a schematic cross section of a gas barrier laminated material according to the second embodiment of the present invention.

In FIG. 2, the gas barrier laminated material, denoted by reference numeral 10, is comprised of a substrate 2, an inorganic compound thin-film layer 3 laminated thereto, and a protective layer 5 further laminated thereto. In this embodiment, the substrate 2 and the inorganic compound thin-film layer 3 may have the same constitution as those described on the gas barrier laminated material according to the first embodiment of the present invention. Accordingly, the protective layer 5 will be described below in detail.

In the second embodiment, the protective layer 5 is, as described above, is a layer formed by coating on the inorganic compound thin-film layer a water-based coating composition containing a water-soluble polymer and at least one of (a) a metal alkoxide or a hydrolyzate thereof and (b) a tin chloride, followed by heat drying. The protective layer 5 thus formed is presumed to have the structure wherein one or both of (a) the metal alkoxide or a hydrolyzate thereof and (b) the tin chloride is/are held in a layerform water-soluble polymer.

In this embodiment, as the water-soluble polymer contained in the water-based coating composition, any polymers capable of forming films may be appropriately used. For example, it is possible to use PVA, polyvinyl pyrrolidone, starch, methyl cellulose, carboxymethyl cellulose, and sodium alginate. In particular, PVA may preferably be used, as having good gas barrier properties by itself. Under the same conditions except it, the use of PVA can provide the gas barrier laminated material with the best gas barrier properties. In the present invention, the PVA, which is obtained by hydrolysis of polyvinyl acetate, may include what is called partially hydrolyzed PVA in which several ten percent of acetic acid groups remain and also what is called completely hydrolyzed PVA in which only several percent of acetic acid groups remain. There are no particular limitations on it.

The (a) metal alkoxide or a hydrolyzate thereof or (b) tin chloride used in the second embodiment may be the same as those used in the gas barrier laminated material according to the first embodiment of the present invention.

With regard to the mixing proportion of the water-soluble polymer to the (a) metal alkoxide or a hydrolyzate thereof and/or (b) tin chloride in the coating composition, the protective layer may become less effective for improving gas barrier properties and also may have a poor water resistance if the water-soluble polymer is in a too large proportion. If on the other hand it is in a too small proportion the protective layer may become brittle to tend to break. Hence, the (a) metal alkoxide or a hydrolyzate thereof and/or (b) tin chloride may preferably be in an amount of from 10 to 1,900 parts by weight, and more preferably from 10 to 900 parts by weight, in total, based on 100 parts by weight of solid content of the water-soluble polymer.

As a solvent for the water-based coating composition, it is possible to use water or a mixed solvent of water and a lower alcohol such as ethanol.

To such a coating composition, known additives such as an isocyanate compound, a silane coupling agent, a dispersant, a stabilizer, a viscosity modifier and a colorant may be appropriately further added if necessary. In particular, the addition of an isocyanate compound can bring about great improvements in water resistance and moisture resistance of the protective layer. Such an isocyanate compound may include TDI, TTI, IPDI, TMXDI, having tow or more isocyanate groups, any of which can be preferably used.

As described above, the protective layer 5 is formed by coating the water-based coating composition on the inorganic compound thin-film layer 3, followed by heat drying.

The water-based coating composition may be coated by any known processes, as exemplified by dip coating, roll coating, screen printing and spray coating, among which a suitable process may be selected.

Conditions for the heat drying that follows the coating may vary depending on the types of the components contained in the water-based coating composition used. Since the heat drying must be carried out at a temperature that may cause no pinholes in the protective layer, the heat drying is usually carried out at a temperature of from 60° to 200° C., and preferably from 80° to 180° C.

The protective layer 5 formed in this way may have a dried-coating thickness of usually from 0.01 to 100 m, and preferably from 0.01 to 50 m, since a too thin layer can not well prevent a lowering of gas barrier properties of the inorganic compound thin-film layer and a too thick layer may cause cracks in the protective layer itself.

A print layer or a heat-sealable thermoplastic resin layer may also be laminated to the protective layer 4 or 5, or to the substrate 2 on its side opposite to the side on which the protective layer 4 or 5 is provided, of the gas barrier laminated material 1 or 10 according to the first embodiment or second embodiment of the present invention as described above. Such a layer may be laminated together with other resin by sand lamination.

The gas barrier laminated material of the present invention as described above has high gas barrier properties and also superior flexibility, water resistance and moisture resistance, and can be improved also in its mechanical strength when other resin is laminated together. Hence, no gas barrier properties can be lost even in an environment of high humidity, and contents such as food and pharmaceuticals can be stored for a long term without causing deterioration. Its gas barrier properties are not damaged also when printing, laminating and bag making are applied to form packages.

EXAMPLES

The present invention will be specifically described below by giving Examples.

Examples 1 to 6 & Comparative Example 1

On each surface of 12 μm thick polyethylene terephthalate (hereinafter "PET") films serving as substrates, a thin-film layer with a layer thickness of 400 angstroms was formed by vacuum deposition according to an electron radiation heater system, using SiO (silicon oxide) as a deposition source, and then a coating composition prepared by mixing the following components in the combination and proportion as shown below was coated thereon by means of a bar coater, followed by drying at 120° C. for 1 minute using a dryer to form a protective layer with a layer thickness of about 0.3 μm. Thus, gas barrier laminated films were obtained.

Components of coating compositions:

(A) A hydrolyzed solution prepared by adding 4.5 g of 0.1N hydrochloric acid to 10.4 g of tetraethoxysilane [$Si(OC_2H_5)_4$; hereinafter "TEOS"], followed by stirring for 30 minutes to carry out hydrolysis, and diluting the product with ethyl acetate to have 3% by weight of solid content in terms of $SiO_2$.

(B) An ethyl acetate solution of 3% by weight of tetrabutoxyzirconium [$Zr(OC_4H_9)$] as solid content in terms of $ZrO_2$.

(C) An ethyl acetate solution of 3% by weight of isophoronediisocyanate (IDPI).

(D) An ethyl acetate solution of 3% by weight of tetramethylxylenediisocyanate (TMXDI).

(E) An ethyl acetate solution of 3% by weight of stannous chloride (anhydrous).

(F) An ethyl acetate solution of 3% by weight of melamine.

(G) An aqueous solution of 3% by weight of formalin.

| Composition of protective layer coating compositions: | | |
|---|---|---|
| Composition | Combination | Mixing proportion (wt. %) |
| No. 1 | (A)/(C) | 60/40 |
| No. 2 | (A)/(D) | 70/30 |
| No. 3 | (A)/(D)/(E) | 70/30/2 |
| No. 4 | (A)/(D)/(F) | 70/30/2 |
| No. 5 | (A)/(D)/(G) | 70/30/1 |
| No. 6 | (B)/(D) | 70/30 |

Gas barrier properties of the gas barrier laminated materials thus obtained were evaluated by measuring their oxygen transmission and water-vapor transmission. The oxygen transmission was measured in an environment of 25° C. and 100% RH using an oxygen transmission measuring device (MOCON OXTRAN 10/40A, manufactured by Modern Controls, Inc.), and the water-vapor transmission was measured in an environment of 40° C. and 90% RH using a water-vapor transmission measuring device (PER MATRAN W6, manufactured by Modern Controls, Inc.).

Results obtained are shown in Table 1.

As Comparative Example 1, a film formed of only a deposited film without coating was produced, and evaluation was made similarly.

TABLE 1

| | Protective layer coating compositions | Oxygen transmission ($cm^3/m^2 \cdot day \cdot atm$) | Water-vapor transmission ($cm^3/m^2 \cdot day \cdot atm$) |
|---|---|---|---|
| Example No. | | | |
| 1 | No. 1 | 0.5 | 0.5 |
| 2 | No. 2 | 0.6 | 0.5 |
| 3 | No. 3 | 0.5 | 0.3 |
| 4 | No. 4 | 0.4 | 0.2 |
| 5 | No. 5 | 0.5 | 0.4 |
| 6 | No. 6 | 0.6 | 0.5 |
| Comparative Example | | | |
| 1 | None | 2.5 | 1.8 |

As is seen from these results, Examples 1 to 6, in which the coating composition is applied to the deposited film, have higher oxygen barrier properties and water-vapor barrier properties than Comparative Example 1, in which no protective layer coating is applied.

Examples 7, 8 & Comparative Example 2

The laminated films of Examples 2 and 4 were each bonded to an unstretched polypropylene (CPP; 30 μm thick) using a polyol-isocyanate type adhesive, with the former's coating surface (protective layer surface) face-to-face as the adhesive surface to the latter to produce laminated films. Thus, gas barrier laminated films of Examples 7 and 8, respectively, were obtained. Their oxygen transmission and water-vapor transmission were measured in the same way and their bond strength was also measured to make evaluation. The bond strength was measured under conditions of: 15 mm of a sample width, T-peeling, and 300 mm/min of a peeling rate.

Results obtained are shown in Table 2.

As Comparative Example 2, CPP was laminated to the laminated film as used in Comparative Example 1, and evaluation was made similarly.

TABLE 2

| | Protective layer coating compositions | Oxygen transmission ($cm^3/m^2 \cdot day \cdot atm$) | Water-vapor transmission ($cm^3/m^2 \cdot day \cdot atm$) | Bond strength (g) |
|---|---|---|---|---|
| Example No. | | | | |
| 7 | No. 2 | 0.5 | 0.4 | 830 |
| 8 | No. 4 | 0.3 | 0.1 | 950 |
| Comparative Example: | | | | |
| 2 | None | 2.0 | 1.3 | 750 |

The laminated films of Examples 7 and 8 and Comparative Example 2 were drawn out at a given elongation using a tensile tester, and thereafter their oxygen transmission and water-vapor transmission were measured and flexibility was also evaluated.

Results obtained are shown in Table 3.

TABLE 3

| Elongation | Oxygen transmission ($cm^3/m^2 \cdot day \cdot atm$) | | | Water-vapor transmission ($cm^3/m^2 \cdot day \cdot atm$) | | |
|---|---|---|---|---|---|---|
| (%) | Ex. 7 | Ex. 8 | Cp. 2 | Ex. 7 | Ex. 8 | Cp. 2 |
| 0 | 0.5 | 0.3 | 2.0 | 0.4 | 0.1 | 1.3 |
| 2.5 | 0.6 | 0.4 | 7.3 | 0.7 | 0.4 | 4.2 |
| 5.0 | 0.8 | 0.5 | 22 | 1.0 | 1.2 | 8.0 |
| 7.5 | 2.1 | 1.6 | 85 | 2.2 | 1.7 | 12 |
| 10.0 | 5.0 | 2.5 | 125 | 5.3 | 4.8 | 12 |

The film of Comparative Example 2 did not stand against tensile deformation at an elongation of several percent and caused cracks in its SiO thin film, resulting in a great decrease in gas barrier properties. On the other hand, the gas barrier laminated films according to the present invention showed little deterioration at an elongation of up to 5% and also only a little deterioration even after further tensile deformation. Thus, the latter films have a reasonable flexibility compared with the laminated film of Comparative Example 2, comprised of the deposited film alone.

Examples 9 to 11 & Comparative Examples 3 to 5

On one sides of 12 μm thick PET films serving as substrates, thin-film layers with a layer thickness of 400 angstroms were each formed by vacuum deposition according to an electron radiation heater system, using $Al_2O_3$, $SnO_2$ or MgO as a deposition source. Then, on each thin-film layer thus formed, a protective layer was formed in the same manner as in Example 1, using the coating composition of Composition No. 4. Thus, gas barrier laminated films of Examples 9 to 11, respectively, were obtained.

With regard to the laminated materials thus obtained, the evaluation was made similarly by measuring their oxygen transmission and water-vapor transmission. As Comparative Examples 3 to 5, corresponding samples without coating were also prepared, and evaluation was made similarly.

Results obtained are shown in Table 4.

TABLE 4

| Example No. | Deposition source | Protective layer coating compositions | Oxygen transmission ($cm^3/m^2 \cdot day \cdot atm$) | Water-vapor transmission ($cm^3/m^2 \cdot day \cdot atm$) |
|---|---|---|---|---|
| 9 | $Al_2O_3$ | No. 4 | 0.3 | 0.1 |
| 3* | " | None | 2.8 | 1.2 |
| 10 | $SnO_2$ | NO. 4 | 0.6 | 0.4 |
| 4* | " | None | 1.5 | 1.5 |
| 11 | MgO | NO. 4 | 0.4 | 0.1 |
| 5* | " | None | 2.6 | 1.0 |

*Comparative Example

As is seen from Table 4, the protective layer thus provided brings about great improvements in oxygen barrier properties and water-vapor barrier properties also when $Al_2O_3$, $SnO_2$ or MgO is used to form the inorganic compound thin-film layer.

Examples 12 to 16 & Comparative Examples 6 to 9

On each surface of 12 μm thick polyethylene terephthalate (hereinafter "PET") films serving as substrates, a thin-film layer with a layer thickness of 400 angstroms was formed by vacuum deposition according to an electron radiation heater system, using SiO (silicon oxide) as a deposition source, and then a water-based coating composition prepared by mixing the following components in the combination and proportion as shown below was coated thereon by means of a bar coater, followed by drying at 120° C. for 1 minute using a dryer to form a protective layer with a layer thickness of about 0.3 μm. Thus, gas barrier laminated films were obtained.

Components of water-based coating compositions:

(A) A hydrolyzed solution prepared by adding 89.6 g of 0.1N hydrochloric acid to 10.4 g of tetraethoxysilane [$Si(OC_2H_5)_4$; hereinafter "TEOS"], followed by stirring for 30 minutes to carry out hydrolysis, having 3% by weight of solid content in terms of $SiO_2$.

(B) A hydrolyzed solution prepared by dissolving 6.0 g of triisopropoxyaluminum [$Al(O-2'-C_3H_7$; hereinafter "TPA"] in 90 g of 80° C. hot water, followed by addition of 4 g of 5N hydrochloric acid to carry out deflocculation, having 3% by weight of solid content in terms of $Al_2O_3$.

(C) A water/ethanol solution of 3% by weight of stannous chloride (anhydrous) (water/ethanol: 50/50 in weight ratio).

(D) An aqueous solution of 3% by weight of stannic chloride (anhydrous).

(E) A water/isopropyl alcohol solution of 3% by weight of polyvinyl pyrrolidone (water/isopropyl alcohol: 90/10 in weight ratio).

(F) A water/ethanol solution of 3% by weight of polyvinyl pyrrolidone (water/ethanol: 50/50 in weight ratio).

(G) Water-based gravure ink; using only water-based vehicle. A water/ethanol solution of 10% by weight of acrylic resin as solid content (water/ethanol: 50/50 in weight ratio).

Composition of protective layer water-based coating compositions:

| Composition | Combination | Mixing proportion (wt. %) |
|---|---|---|
| No. 7 | (A)/(E) | 60/40 |
| No. 8 | (A)/(B)/(F) | 50/10/40 |
| No. 9 | (C)/(E) | 60/40 |
| No. 10 | (A)/(C)/(E) | 40/30/30 |
| No. 11 | (A)/(D)/(E) | 40/30/30 |
| No. 12 | (E) | 100 |
| No. 13 | (F) | 100 |
| NO. 14 | (G) | 100 |

Gas barrier properties of the gas barrier laminated materials thus obtained were stored for 4 weeks in an environment of constant temperature and humidity kept at 40° C. and 90% RH, and the gas barrier properties before and after the storage were evaluated by measuring their oxygen transmission and water-vapor transmission. The oxygen transmission was measured in an environment of 25° C. and 100% RH using an oxygen transmission measuring device (MOCON OXTRAN 10/40A, manufactured by Modern Controls, Inc.), and the water-vapor transmission was measured in an environment of 40° C. and 90%RH using a water-vapor transmission measuring device (PERMATRAN W6, manufactured by Modern Controls, Inc.).

Results obtained are shown in Table 5.

As Comparative Examples 6 to 9, a film formed of only a deposited film without protective layer coating and gas barrier laminated materials each having a coating film formed of only a water-soluble polymer or a coating film formed of only a water-based ink were also produced, and evaluation was made similarly.

TABLE 5

| | Protective layer water-based coating compositions | Oxygen transmission | | Water-vapor transmission | |
|---|---|---|---|---|---|
| | | Before storage ($cm^3/m^2$ day · atm) | After storage | Before storage ($cm^3/m^2$ day · atm) | After storage |
| Example No. | | | | | |
| 12 | No. 7 | 0.3 | 0.5 | 0.3 | 0.6 |
| 13 | No. 8 | 1.0 | 1.5 | 1.5 | 1.8 |
| 14 | No. 9 | 0.3 | 0.6 | 0.4 | 0.8 |
| 15 | No. 10 | 0.2 | 0.3 | 0.1 | 0.2 |
| 16 | No. 11 | 0.3 | 0.6 | 0.2 | 0.4 |
| Comparative Example: | | | | | |
| 6 | No coating | 2.3 | 2.3 | 1.8 | 1.8 |
| 7 | No. 12 | 1.4 | 2.4 | 1.5 | 1.7 |
| 8 | No. 13 | 1.7 | 2.1 | 1.5 | 1.9 |
| 9 | No. 14 | 1.6 | 2.0 | 1.2 | 1.7 |

As is seen from these results, the laminated films of Examples 12 to 16, in which the water-based coating composition is applied to the deposited film, show higher oxygen barrier properties and water-vapor barrier properties than the film of Comparative Example 6, in which no protective layer coating is applied. The films of Comparative Examples 7 to 9 bring about a little improvement in gas barrier properties but show a decrease in gas barrier properties after their storage in the environment of high humidity.

Examples 17, 18 & Comparative Examples 10 to 13

The laminated films of Examples 12 and 15 and Comparative Examples 6 and 9 were each bonded to an unstretched polypropylene (CPP; 30 µm thick) using a polyol-isocyanate type adhesive, with the former's coating surface (protective layer surface) face-to-face as the adhesive surface to the latter to produce laminated films. Thus, gas barrier laminated films were respectively obtained. Their oxygen transmission and water-vapor transmission and their bond strength were also measured to make evaluation. The bond strength was measured under conditions of: 15 mm of a sample width, T-peeling, and 300 mm/min of a peeling rate.

Results obtained are shown in Table 8.

In order to examine how the formation of SiO thin film is effective in respect of Examples 17 and 18 and Comparative Example 11, the corresponding coating compositions were coated on PET films having no SiO thin films formed thereon, to form protective layers with a layer thickness of 0.3 µm each. Thus, laminated films of Comparative Examples 12 to 14, respectively, were obtained and the measurement and evaluation were made similarly.

TABLE 6

| Example No. | Protective layer water-based coating compositions | Substrate (PET) | Oxygen transmission ($cm^3/m^2$ · day · atm) | Water-vapor transmission | Bond strength (g) |
|---|---|---|---|---|---|
| 17 | No. 7 | SiO-deposited | 0.2 | 0.2 | 355 |
| 12* | " | Not SiO-dep. | 0.5 | 12 | 120 |
| 18 | No. 10 | SiO-deposited | 0.1 | 0.1 | 340 |
| 13* | " | Not SiO-dep. | 0.3 | 10.5 | 185 |
| 10* | None | SiO-deposited | 1.8 | 1.6 | 350 |
| 11* | No. 14 | SiO-deposited | 1.5 | 1.5 | 180 |
| 14* | " | Not SiO-dep. | 120 | 12 | 50 |

*Comparative Example

As is seen from the results, oxygen barrier properties can be achieved to a certain degree even if no SiO thin film is formed on the substrate, but water-vapor barrier properties are low. When the SiO thin film is formed on the substrate, high oxygen gas barrier properties and high water-vapor barrier properties can be achieved and also the bond strength is greatly improved as compared with the films having no SiO thin film.

The laminated films of Examples 17 and Comparative Examples 10 and 11 were drawn out at a given elongation using a tensile tester, and thereafter their oxygen transmission and water-vapor transmission were measured and flexibility was also evaluated.

Results obtained are shown in Table 7.

TABLE 7

| Elongation (%) | Oxygen transmission ($cm^3/m^2 \cdot day \cdot atm$) | | | Water-vapor transmission ($cm^3/m^2 \cdot day \cdot atm$) | | |
|---|---|---|---|---|---|---|
| | Ex. 17 | Cp. 10 | Cp. 11 | Ex. 17 | Cp. 10 | Cp. 11 |
| 0 | 0.2 | 1.8 | 1.5 | 0.2 | 1.6 | 1.5 |
| 2.5 | 0.2 | 5.9 | 2.5 | 0.3 | 4.0 | 1.7 |
| 5.0 | 0.4 | 34 | 22 | 0.5 | 10 | 8.0 |
| 7.5 | 0.7 | 110 | 85 | 1.0 | 12 | 12 |
| 10.0 | 1.0 | 125 | 125 | 1.4 | 12 | 12 |
| 20.0 | 3.5 | 125 | 125 | 5.0 | 14 | 13 |

The film of Comparative Example 2 provided with no protective layer did not stand against tensile deformation at an elongation of several percent and caused cracks in its SiO thin film, resulting in a great decrease in gas barrier properties. On the other hand, the gas barrier laminated film according to the present invention showed little deterioration at an elongation of up to 10% and also only a little deterioration even after further tensile deformation. Thus, the latter film has a reasonable flexibility compared with the laminated film of Comparative Example 2, comprised of the deposited film alone. The laminated film of Comparative Example 11, formed by coating a water-based gravure ink, began to undergo tensile deformation at an elongation of several percent, where the deterioration was prevented to some extent but at only a little degree.

Examples 19 to 21

On one sides of 12 μm thick PET films serving as substrates, thin-film layers with a layer thickness of 400 angstroma were each formed by vacuum deposition according to an electron radiation heater system, using $Al_2O_3$, $SnO_2$ or MgO as a deposition source. Then, on each thin-film layer thus formed, a protective layer was formed in the same manner as in Example 12, using the coating composition of Composition No. 10. Thus, gas barrier laminated films of Examples 19 to 21, respectively, were obtained.

With regard to the laminated materials thus obtained, the evaluation was made similarly by measuring their oxygen transmission and water-vapor transmission.

Results obtained are shown in Table 8. For reference, the results of measurement on the laminated films of Comparative Examples 3 to 5 (without protective layer coating) are again shown together in Table 8.

TABLE 8

| Example No. | Deposition source | Protective layer water-based coating compositions | Oxygen transmission ($cm^3/m^2 \cdot day \cdot atm$) | Water-vapor transmission ($cm^3/m^2 \cdot day \cdot atm$) |
|---|---|---|---|---|
| 19 | $Al_2O_3$ | No. 10 | 0.3 | 0.2 |
| 3* | " | None | 2.8 | 1.2 |
| 20 | $SnO_2$ | No. 10 | 0.5 | 0.5 |
| 4* | " | None | 1.5 | 1.5 |
| 21 | MgO | No. 10 | 0.6 | 0.3 |
| 5* | " | None | 2.6 | 1.0 |

*Comparative Example

As is seen from Table 8, the protective layer thus provided brings about great improvements in oxygen barrier properties and water-vapor barrier properties also when $Al_2O_3$, $SnO_2$ or MgO is used to form the inorganic compound thin-film layer.

What is claimed is:

1. A gas barrier laminated material comprising a polymer sheet of film substrate, and an inorganic compound layer having a thickness of from 50 angstroms to 3,000 angstroms and a protective layer having a thickness of from 0.01 μm to 100 μm which are laminated in this order, wherein said protective layer is formed by coating on said inorganic compound layer a coating composition containing a metal alkoxide or a hydrolyzate thereof and from 5 parts by weight to 400 parts by weight of an isocyanate compound having two or more isocyanate groups based on 100 parts by weight of the metal alkoxide or hydrolyzate thereof, followed by heat drying.

2. The gas barrier laminated material according to claim 1, wherein said metal alkoxide is represented by Formula (1):

$$M(OR)_n \tag{1}$$

wherein M represents a metal atom, n represents a valence of M, and R's that number n each independently represent a straight-chain or branched alkyl group having 1 to 6 carbon atoms.

3. The gas barrier laminated material according to claim 2, wherein said M in Formula (1) is Si, Al or Zr.

4. The gas barrier laminated material according to claim 2, wherein said metal alkoxide is tetraethoxysilane, triisopropoxyaluminum or tetrabutoxyzirconium.

5. The gas barrier laminated material according to any one of claims 1 to 4, wherein said isocyanate compound having two or more isocyanate groups is tolylenediisocyanate, triphenylmethanetriisocyanate, isophoronediisocyanate, tetramethylxylenediisocyanate, or a polymer of any of these.

6. The gas barrier laminated material according to claim 1, wherein said coating composition further contains a tin chloride.

7. The gas barrier laminated material according to claim 1, wherein said coating composition further contains a melamine compound or a melamine resin.

8. The gas barrier laminated material according to claim 1, wherein said protective layer has a thickness of from 0.01 μm to 50 μm.

9. The gas barrier laminated material according to claim 1, wherein said inorganic compound layer is formed of an oxide, nitride or fluoride of silicon, aluminum, titanium, zirconium or tin, or a mixture of any of these.

10. The gas barrier laminated material according to claim 9, wherein said inorganic compound layer is an aluminum oxide deposited layer.

* * * * *